(12) United States Patent
Woldemariam et al.

(10) Patent No.: US 11,486,338 B2
(45) Date of Patent: Nov. 1, 2022

(54) AIRCRAFT CABIN AIR OUTFLOW TEMPERATURE CONTROL FOR DOWNSTREAM OPERATIONS

(71) Applicant: Hamilton Sundstrand Corporation, Charlotte, NC (US)

(72) Inventors: Beakal T. Woldemariam, South Windsor, CT (US); Eric Surawski, Hebron, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 414 days.

(21) Appl. No.: 16/697,435

(22) Filed: Nov. 27, 2019

(65) Prior Publication Data
US 2021/0156346 A1 May 27, 2021

(51) Int. Cl.
*B64D 13/06* (2006.01)
*F02M 31/20* (2006.01)
*B01D 53/26* (2006.01)
*B64D 37/32* (2006.01)

(52) U.S. Cl.
CPC .......... *F02M 31/20* (2013.01); *B01D 53/265* (2013.01); *B64D 13/06* (2013.01); *B64D 37/32* (2013.01); *B64D 2013/0618* (2013.01)

(58) Field of Classification Search
CPC .......... F02M 27/02; B64D 2013/0603; B64D 2013/0607; B64D 2013/0614; B64D 2013/0618; B64D 2013/0688; F02C 7/224; F02C 6/08
See application file for complete search history.

(56) References Cited

U.S. PATENT DOCUMENTS

| 3,847,298 A | 11/1974 | Hamilton |
| 6,182,435 B1* | 2/2001 | Niggemann ............ F01D 25/12 60/730 |
| 9,327,243 B2 | 5/2016 | Jojic et al. |
| 9,731,834 B2 | 8/2017 | Hagh et al. |

(Continued)

FOREIGN PATENT DOCUMENTS

| EP | 1902954 A2 | 3/2008 |
| EP | 2927130 A1 | 10/2015 |

(Continued)

OTHER PUBLICATIONS

European Search Report for European Application No. 20203819.6, International Filing Date Oct. 26, 2020, dated Mar. 26, 2021, 7 pages.

*Primary Examiner* — Todd E Manahan
*Assistant Examiner* — Thuyhang N Nguyen
(74) *Attorney, Agent, or Firm* — Cantor Colburn LLP

(57) ABSTRACT

Cabin outflow temperature control systems and methods for use on aircraft are described. The systems include an aircraft cabin, a heat load source, a heat exchanger configured to receive cabin outflow air from the aircraft cabin and heat load discharge air, the heat exchanger configured to enable thermal transfer from the heat load discharge air to the cabin outflow air to generate high temperature cabin outflow air and low temperature discharge air as outputs from the heat exchanger, and one or more downstream operation systems configured to receive the high temperature cabin outflow air and perform a downstream operation using said high temperature cabin outflow air.

19 Claims, 5 Drawing Sheets

(56) References Cited

U.S. PATENT DOCUMENTS

| | | | |
|---|---|---|---|
| 2008/0070078 A1* | 3/2008 | Gummalla | H01M 8/04141 429/495 |
| 2015/0353201 A1* | 12/2015 | Hagh | A62C 3/08 244/135 R |
| 2017/0313435 A1 | 11/2017 | D'Orlando et al. | |
| 2018/0127110 A1* | 5/2018 | Cordatos | B64D 37/32 |
| 2018/0155050 A1 | 6/2018 | Surawski et al. | |
| 2019/0017399 A1* | 1/2019 | Fraile Martin | B64D 33/00 |
| 2019/0283897 A1 | 9/2019 | D'Orlando et al. | |
| 2019/0283898 A1 | 9/2019 | D'Orlando et al. | |
| 2019/0383220 A1* | 12/2019 | Mackin | F02C 9/18 |

FOREIGN PATENT DOCUMENTS

| | | |
|---|---|---|
| EP | 3254970 A1 | 12/2017 |
| EP | 3326915 A1 | 5/2018 |

\* cited by examiner ly relates to
AIRCRAFT CABIN AIR OUTFLOW TEMPERATURE CONTROL FOR DOWNSTREAM OPERATIONS

BACKGROUND

The subject matter disclosed herein generally relates to uses of cabin outflow air on aircraft and, more particularly, controlling temperature of cabin outflow air on aircraft to perform downstream operations.

In general, aircraft pneumatic systems including, air conditioning systems, cabin pressurization and cooling, and fuel tank inerting systems are powered by engine bleed air. For example, pressurized air from an engine of the aircraft is provided to a cabin through a series of systems that alter the temperatures and pressures of the pressurized air. To power this preparation of the pressurized air, generally the source of energy is the pressure of the air itself.

The air bled from engines may be used for environmental control systems, such as used to supply air to the cabin and to other systems within an aircraft. Additionally, the air bled from engines may be supplied to inerting apparatuses to provide inert gas to a fuel tank. In other cases, the air may be sourced from compressed RAM air.

Regardless of the source, typically the air for fuel tank inerting is passed through a porous hollow fiber membrane tube bundle known as an "air separation module." A downstream flow control valve is controlled or passively operated to apply back pressure on the air separation module to force some amount of air through the membrane as opposed to flowing though the tube. Oxygen passes more easily through the membrane, leaving only nitrogen enriched air to continue through the flow control valve into the fuel tank. Typically air separation modules employ a dedicated ram air heat exchanger in conjunction with a bypass valve.

Further, aircraft may be configured such that cabin outflow air is dumped overboard in a thrust recovery operation. Typically, each of these systems is substantially independent from each other.

BRIEF DESCRIPTION

According to some embodiments, cabin outflow temperature control systems for aircraft are provided. The systems include an aircraft cabin, a heat load source, a heat exchanger configured to receive cabin outflow air from the aircraft cabin and heat load discharge air from the heat lead source, the heat exchanger configured to enable thermal transfer from the heat load discharge air to the cabin outflow air to generate high temperature cabin outflow air and low temperature discharge air as outputs from the heat exchanger, and one or more downstream operation systems configured to receive the high temperature cabin outflow air and perform a downstream operation using said high temperature cabin outflow air.

In addition to one or more of the features described herein, or as an alternative, further embodiments of the systems may include that the heat load source is a catalytic reactor of an aircraft fuel tank inerting system.

In addition to one or more of the features described herein, or as an alternative, further embodiments of the systems may include a condenser configured to receive the low temperature discharge air prior to directing an inert gas to a fuel tank ullage.

In addition to one or more of the features described herein, or as an alternative, further embodiments of the systems may include that the one or more downstream operation systems comprises at least one of thrust recovery system, a downstream pneumatic system, or a heating system.

In addition to one or more of the features described herein, or as an alternative, further embodiments of the systems may include that the one or more downstream operation systems comprises power generation system.

In addition to one or more of the features described herein, or as an alternative, further embodiments of the systems may include that the one or more downstream operation systems comprises a thrust recovery system and a downstream pneumatic system of the aircraft, arranged in parallel, such that a first portion of the high temperature cabin outflow air is directed to the thrust recovery system and a second portion of the high temperature cabin outflow air is directed to the downstream pneumatic system.

In addition to one or more of the features described herein, or as an alternative, further embodiments of the systems may include that the one or more downstream operation systems comprises a thrust recovery system and a downstream pneumatic system of the aircraft, arranged in series, such that the high temperature cabin outflow air is directed to the downstream pneumatic system first and then to the thrust recovery system.

In addition to one or more of the features described herein, or as an alternative, further embodiments of the systems may include that the one or more downstream operation systems comprises a thrust recovery system, a heating system, and a downstream pneumatic system of the aircraft, arranged in parallel, such that a first portion of the high temperature cabin outflow air is directed to the thrust recovery system, a second portion of the high temperature cabin outflow air is directed to the heating system, and a third portion of the high temperature cabin outflow air is directed to the downstream pneumatic system.

In addition to one or more of the features described herein, or as an alternative, further embodiments of the systems may include that the cabin outflow air has a temperature of about 30° C. and the high temperature cabin outflow air has a temperature of about 200° C.

In addition to one or more of the features described herein, or as an alternative, further embodiments of the systems may include that the heat load discharge air has a temperature of about 200° C. or greater and the low temperature discharge air has a temperature of about 80° C. or less.

According to some embodiments, methods of using cabin outflow on aircraft are provided. The methods include directing aircraft cabin outflow air to a heat exchanger, directing a heat load discharge air to the heat exchanger from a heat load source, causing a thermal transfer from the heat load discharge air to the cabin outflow air to generate high temperature cabin outflow air and low temperature discharge air as outputs from the heat exchanger, and performing one or more downstream operations using said high temperature cabin outflow air.

In addition to one or more of the features described herein, or as an alternative, further embodiments of the methods may include that the heat load source is a catalytic reactor of an aircraft fuel tank inerting system.

In addition to one or more of the features described herein, or as an alternative, further embodiments of the methods may include condensing the low temperature discharge air to extract water from the low temperature discharge air prior to directing an inert gas to a fuel tank ullage.

In addition to one or more of the features described herein, or as an alternative, further embodiments of the methods may include that the one or more downstream operations comprise at least one of a thrust recovery operation, a heating operation, and a downstream pneumatic operation.

In addition to one or more of the features described herein, or as an alternative, further embodiments of the methods may include that the one or more downstream operations is a power generation operation.

In addition to one or more of the features described herein, or as an alternative, further embodiments of the methods may include that the one or more downstream operations comprise a thrust recovery operation and a power generation operation, wherein the thrust recovery operation and the power generation are performed in parallel such that a first portion of the high temperature cabin outflow air is directed to the thrust recovery operation and a second portion of the high temperature cabin outflow air is directed to the power generation operation.

In addition to one or more of the features described herein, or as an alternative, further embodiments of the methods may include that the one or more downstream operations comprise a thrust recovery operation and a power generation operation, wherein the thrust recovery operation and the power generation are performed in series such that the high temperature cabin outflow air is directed to the power generation operation first and subsequently to the thrust recovery operation.

In addition to one or more of the features described herein, or as an alternative, further embodiments of the methods may include that the one or more downstream operations comprise a thrust recovery operation, a heating operation, and a power generation operation, wherein the power generation operation and the thrust recovery operation are performed in series using a first portion of the high temperature cabin outflow air and a second portion of the high temperature cabin outflow air is directed to the heating operation in parallel.

In addition to one or more of the features described herein, or as an alternative, further embodiments of the methods may include that the cabin outflow air has a temperature of about 30° C. and the high temperature cabin outflow air has a temperature of about 200° C.

In addition to one or more of the features described herein, or as an alternative, further embodiments of the methods may include that the heat load discharge air has a temperature of about 200° C. or greater and the low temperature discharge air has a temperature of about 80° C. or less.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1A:
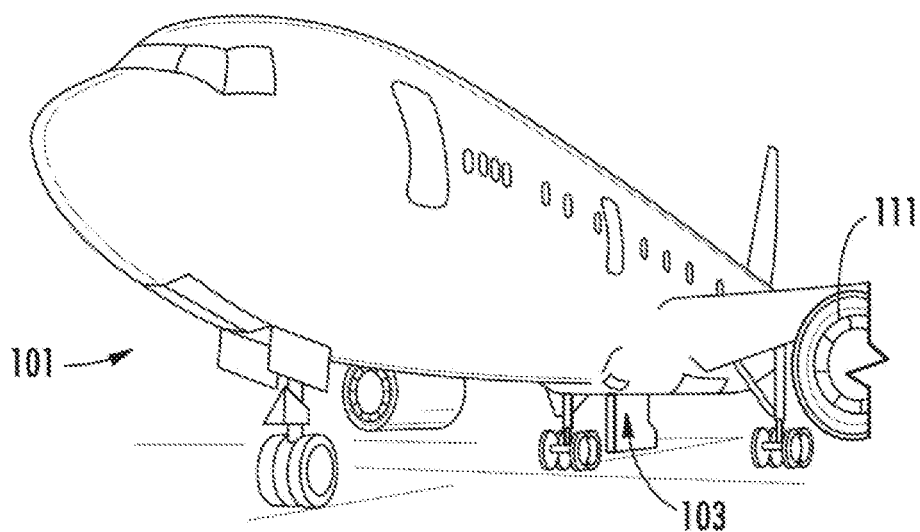
FIG. 1A is a schematic illustration of an aircraft that can incorporate various embodiments of the present disclosure.
Figure 1B:
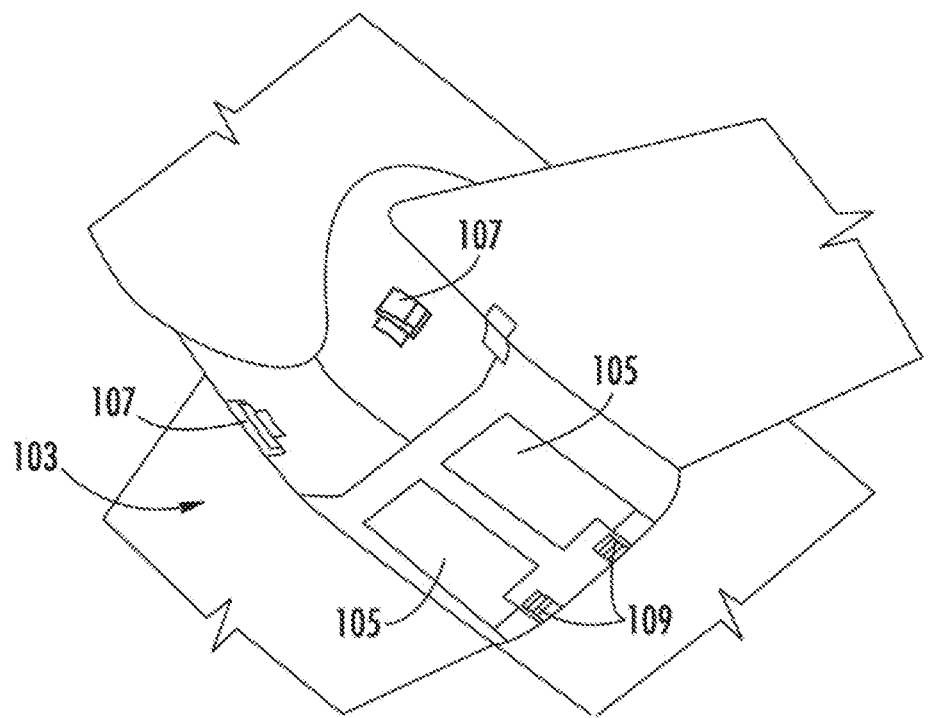
FIG. 1B is a schematic illustration of a bay section of the aircraft of FIG. 1A.

As shown in FIGS. 1A-1B, an aircraft 101 can include one or more bays 103 beneath a center wing box. The bay 103 can contain and/or support one or more components of the aircraft 101. For example, in some configurations, the aircraft 101 can include environmental control systems and/or fuel inerting systems within the bay 103. As shown in FIG. 1B, the bay 103 includes bay doors 105 that enable installation and access to one or more components (e.g., environmental control systems, fuel inerting systems, etc.). During operation of environmental control systems and/or fuel inerting systems of the aircraft 101, air that is external to the aircraft 101 can flow into one or more environmental control systems within the bay doors 105 through one or more ram air inlets 107. The air may then flow through the environmental control systems to be processed and supplied to various components or locations within the aircraft 101 (e.g., passenger cabin, fuel inerting systems, etc.). Some air may be exhaust through one or more ram air exhaust outlets 109.

Also shown in FIG. 1A, the aircraft 101 includes one or more engines 111. The engines 111 are typically mounted on wings of the aircraft 101, but may be located at other locations depending on the specific aircraft configuration. In some aircraft configurations, air can be bled from the engines 111 and supplied to environmental control systems and/or fuel inerting systems, as will be appreciated by those of skill in the art.

As noted above, typical air separation modules operate using pressure differentials to achieve desired air separation. Such systems require a high pressure pneumatic source to drive the separation process across a membrane. Further, the hollow fiber membrane separators commonly used are relatively large in size and weight, which is a significant consideration with respect to aircraft (e.g., reductions in volume and weight of components can improve flight efficiencies). Embodiments provided herein provide reduced volume and/or weight characteristics of inert-gas or low-oxygen supply systems for aircraft by employing a catalytic reactor. In accordance with some embodiments of the present disclosure, the typical hollow fiber membrane separator is replaced by an exothermic system (e.g., catalytic $CO_2$ generation system), which can be, for example, smaller, lighter, and/or more efficient than the typical fiber membrane separators while also generating excess heat. That is, in accordance with some embodiments of the present disclosure, the use of hollow fiber membrane separators may be eliminated.

When a catalytic reactor is employed, a small amount of fuel vapor (e.g., a "first reactant") is reacted with a source of gas containing oxygen (e.g., a "second reactant") within a reactor (e.g., catalytic reactor). The product of the reaction is carbon dioxide, water vapor, and excess heat. The source of the second reactant (e.g., air) can be bleed air or any other source of air containing oxygen, including, but not limited to, high-pressure sources (e.g., engine), bleed air, cabin air, etc. A catalyst material is used to induce a chemical reaction, including, but not limited to, precious metal materials. The carbon dioxide that results from the reaction is an inert gas that is mixed with nitrogen naturally found in fresh/ambient air, and is directed back within a fuel tank to create an inert environment within the fuel tank, thus reducing a flammability of the vapors in the fuel tank.

In accordance with some embodiments of the present disclosure, a catalyst is used to induce a chemical reaction between oxygen ($O_2$) and fuel vapor to produce carbon dioxide ($CO_2$) and water vapor. The source of oxygen used in the reaction can come from any of a number of sources, including, but not limited to, pneumatic sources on an aircraft that supply air at a pressure greater than ambient. The fuel vapor is supplied from an aircraft fuel tank, in liquid or vapor form. The fuel can be heated to vaporize the fuel, such as by using an electric heater, may be atomized or vaporized using a pump or similar system, or otherwise vaporized/atomized. The fuel vapor and oxygen are mixed.

The mixed air stream (fuel vapor and Oxygen or air) is then introduced to a catalytic reactor, which induces a chemical reaction that transforms the $O_2$ and fuel vapor into $CO_2$ and water vapor. This process is an exothermic reaction that generates heat. Any inert gas species that are present in the mixed stream (for example, Nitrogen), will not react and will thus pass through the catalyst unchanged. In some embodiments, the catalyst is in a form factor that acts as a heat exchanger. For example, in one non-limiting configuration, a plate fin heat exchanger configuration is employed wherein a hot side of the heat exchanger would be coated with catalyst material. In such arrangement, the cold side of the catalyst heat exchanger can be fed with a cool air source, such as ram air or some other source of cold air. The air through the cold side of the heat exchanger can be controlled such that the temperature of a hot, mixed-gas stream is hot enough to sustain a desired chemical reaction within or at the catalyst. Further, the cooling air can be used to maintain a cool enough temperature to enable removal of heat generated by exothermic reactions at the catalyst.

As noted above, the catalytic chemical reaction generates water vapor and heat. Having water (in any form) enter primary fuel tank can be undesirable. Thus, the water from a product gas stream (e.g., exiting the catalyst) can be removed through various mechanisms, including, but not limited to, condensation. The product gas stream can be directed to enter a heat exchanger downstream from the catalyst that is used to cool the product gas stream such that the water vapor condenses and drops out of the product gas stream (i.e., leaving a dry inert gas). The liquid water can then be drained overboard. In some embodiments, an optional water separator can be used to augment or provide water separation from the product stream.

Figure 2:
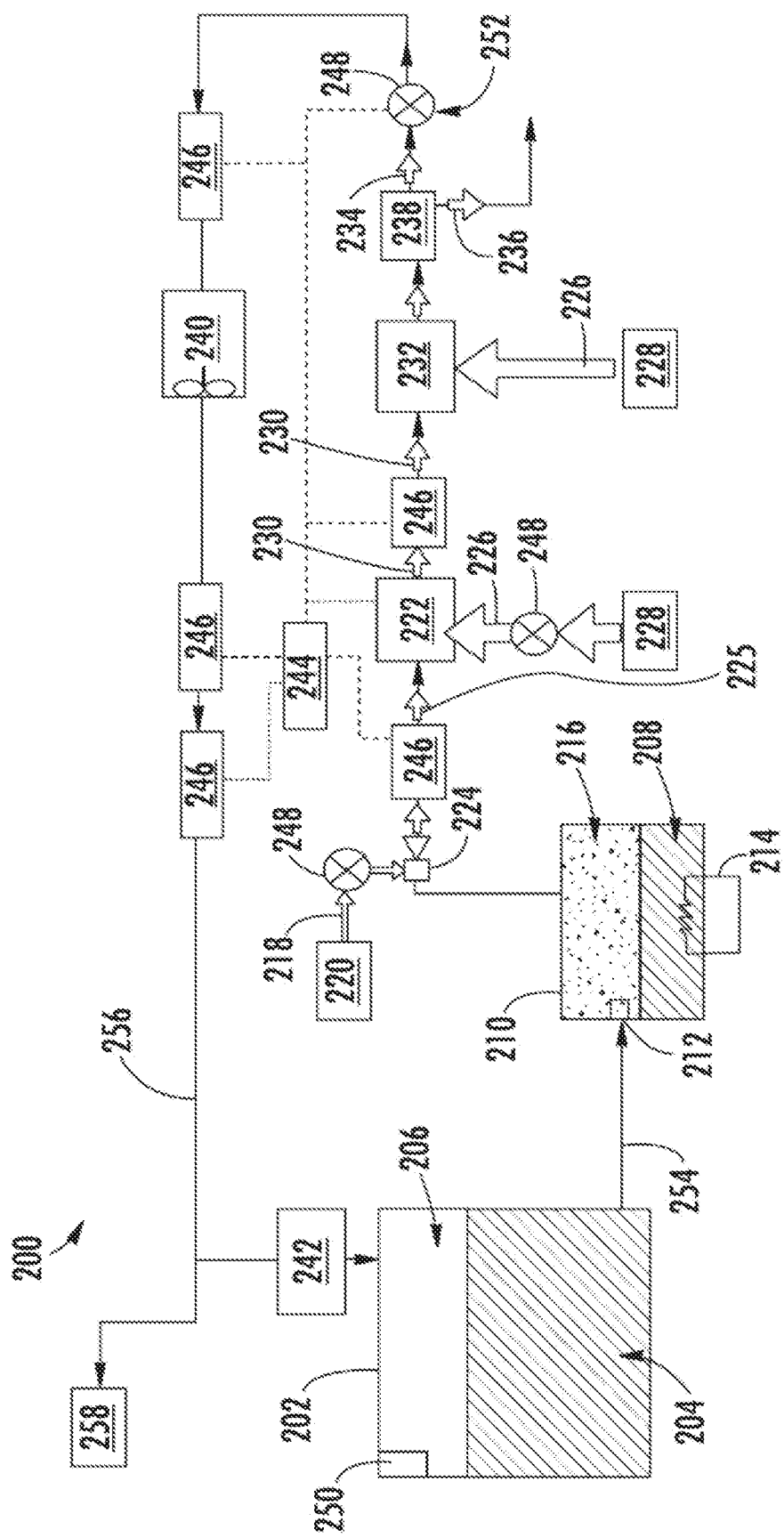
FIG. 2 is a schematic illustration of a fuel tank inerting system in accordance with an embodiment of the present disclosure.

FIG. 2 is a schematic illustration of a flammability reduction or inerting system 200 utilizing a catalytic reaction to produce inert gas in accordance with an embodiment of the present disclosure. The inerting system 200, as shown, includes a fuel tank 202 having fuel 204 therein. As the fuel 204 is consumed during operation of one or more engines, an ullage space 206 forms within the fuel tank 202. To reduce flammability risks associated with vaporized fuel that may form within the ullage space 206, an inert gas can be generated and fed into the ullage space 206.

In this illustrative and non-limiting configuration, an inerting fuel 208 can be extracted from the fuel tank 202 and supplied into an evaporator container 210. The amount of fuel 204 that is extracted into the evaporator container 210 (i.e., the amount of inerting fuel 208) can be controlled by an evaporator container valve 212, such as a float valve. The inerting fuel 208, which may be in liquid form when pulled from the fuel tank 202, can be vaporized within the evaporator container 210 using a heater 214, such as an electric heater, to generate a first reactant 216 (i.e., fuel vapor). The first reactant 216, when generated, is a vaporized portion of the inerting fuel 208 and may be located within the evaporator container 210. The first reactant 216 is directed to be mixed with a second reactant 218. The second reactant 218 is sourced from a second reactant source 220. The second reactant 218 is typically oxygen-rich air that can be catalyzed with the first reactant 216 to generate an inert gas to be supplied into the ullage space 206 of the fuel tank 202.

The second reactant 218 can come from any source on an aircraft that is at a pressure greater than ambient, including, but not limited to bleed air from an engine, cabin air, high pressure air extracted or bled from an engine, etc. (i.e., any second reactant source 220 can take any number of configurations and/or arrangements). The first reactant 216 and the second reactant 218 can be directed into a catalytic reactor 222 by and/or through a mixer 224, which, in some embodiments, may be an ejector or jet pump. The mixer 224 will mix the first and second reactants 216, 218 into a mixed air stream 225 for reaction of the constituent parts thereof within the catalytic reactor 222.

The catalytic reactor 222 can be temperature controlled to ensure a desired chemical reaction efficiency such that an inert gas can be efficiently produced by the inerting system 200 from the mixed air stream 225. Accordingly, cooling air 226 can be provided to extract heat from the catalytic reactor 222 to achieve a desired thermal condition for the chemical reaction within the catalytic reactor 222. The cooling air 226 can be sourced from a cool air source 228 of an aircraft.

A catalyzed mixture 230 leaves the catalytic reactor 222 and is passed through a heat exchanger 232. The heat exchanger 232 operates as a condenser on the catalyzed mixture 230 to separate out an inert gas 234 and a byproduct 236. A cooling air is supplied into the heat exchanger 232 to achieve the condensing functionality. In some embodiments, as shown, a cooling air 226 can be sourced from the same cool air source 228 as that provided to the catalytic reactor 222, although in other embodiments the cool air sources for the two components may be different. The cooling air 226 that flows through the heat exchanger 232 may thus perform a heat pickup operation to extract thermal energy from the catalyzed mixture 230, and thus reduce a temperature of the catalyzed mixture 230. A byproduct 236 of such condensation may be liquid water or water vapor, and thus, in the present configuration shown in FIG. 2, a water separator 238 is provided downstream of the heat exchanger 232 to extract the liquid water or water vapor from the catalyzed mixture 230. After condensation and water separation, only an inert gas 234 is provided to the ullage space 206 of the fuel tank 202.

The inerting system 200 can include additional components including, but not limited to, a fan 240, a flame arrestor 242, and a controller 244. Various other components can be included without departing from the scope of the present disclosure. Further, in some embodiments, certain of the included components may be optional and/or eliminated. For example, in some arrangements, the fan 240 and/or the water separator 238 can be omitted. The controller 244 can be in operable communication with one or more sensors 246 and valves 248 to enable control of the inerting system 200.

In one non-limiting example of operation, flammability reduction is achieved by the inerting system 200 by utilizing the catalytic reactor 222 to induce a chemical reaction between oxygen (second reactant 218) and fuel vapor (first reactant 216) to produce carbon dioxide (inert gas 234) and water in vapor phase (byproduct 236). The source of the second reactant 218 (e.g., oxygen) used in the reaction can come from any source on the aircraft that is at a pressure greater than ambient. The fuel vapor (first reactant 216) is created by draining a small amount of fuel 204 from the fuel tank 202 (e.g., a primary aircraft fuel tank) into the evaporator container 210. The inerting fuel 208 within the evaporator container 210 is heated using the electric heater 214. In some embodiments, the first reactant 216 (e.g., fuel vapor) is removed from the evaporator container 210 by using the mixer 224 to induce a suction pressure that pulls the first reactant 216 out of the evaporator container 210. The mixer 224, in such embodiments, utilizes the elevated pressure of the second reactant source 220 to induce a secondary flow within the mixer 224 which is sourced from the evaporator container 210. Further, as noted above, the mixer 224 is used to mix the two gas streams (first and second reactants 216, 218) together to form the mixed air stream 225.

The mixed air stream 225 (e.g., fuel vapor and oxygen or air) is then introduced to the catalytic reactor 222, inducing a chemical reaction that transforms the mixed air stream 225 (e.g., fuel and air) into the inert gas 234 and the byproduct 236 (e.g., carbon dioxide and water vapor). It is noted that any inert gas species that are present in the mixed air stream 225 (for example, nitrogen) will not react within the catalytic reactor 220 and will thus pass there through unchanged. In some embodiments, the catalytic reactor 222 is in a form factor that acts as a heat exchanger. Those of skill in the art will appreciate that various types and/or configurations of heat exchangers may be employed without departing from the scope of the present disclosure. The cold side of the catalyst heat exchanger can be fed with the cooling air 226 from the cool air source 228 (e.g., ram air or some other source of cold air). The air through the cold side of the catalytic reactor 222 can be controlled such that the temperature of the hot mixed gas stream 225 is hot enough to sustain the chemical reaction desired within the catalytic reactor 222, but cool enough to remove at least a portion of the heat generated by the exothermic reaction, thus maintaining aircraft safety and materials from exceeding maximum temperature limits.

As noted above, the chemical reaction process within the catalytic reactor 222 can produce byproducts, including water in vapor form. It may be undesirable to have water (in any form) enter the fuel tank 202. Accordingly, water byproduct 236 can be removed from the product gas stream (i.e., inert gas 234) through condensation. To achieve this, catalyzed mixture 230 enters the heat exchanger 232 that is used to cool the catalyzed mixture 230 such that the byproduct 236 can be removed (e.g., a majority of the water vapor condenses and drops out of the catalyzed mixture 230). The byproduct 236 (e.g., liquid water) can then be drained overboard. An optional water separator 238 can be used to accomplish this function. Further, the cooling air (e.g., cooling air 226) passing through the heat exchanger 232 will have heat pickup and increase in temperature after passing through the heat exchanger 232.

A flow control valve 248 located downstream of the heat exchanger 232 and optional water separator 238 can meter the flow of the inert gas 234 to a desired flow rate. An optional boost fan 240 can be used to boost the gas stream pressure of the inert gas 234 to overcome a pressure drop associated with ducting between the outlet of the heat exchanger 232 and the discharge of the inert gas 234 into the fuel tank 202. The flame arrestor 242 at an inlet to the fuel tank 202 is arranged to prevent any potential flames from propagating into the fuel tank 202.

Typically, independent of any aircraft flammability reduction system(s), aircraft fuel tanks (e.g., fuel tank 202) need to be vented to ambient. Thus, as shown in FIG. 2, the fuel tank 202 includes a vent 250. At altitude, pressure inside the fuel tank 202 is very low and is roughly equal to ambient pressure. During descent, however, the pressure inside the fuel tank 202 needs to rise to equal ambient pressure at sea level (or whatever altitude the aircraft is landing at). This requires gas entering the fuel tank 202 from outside to equalize the pressure. When air from outside enters the fuel tank 202, water vapor can be carried by the ambient air into the fuel tank 202. To prevent water/water vapor from entering the fuel tank 202, the inerting system 200 can repressurize the fuel tank 202 with the inert gas 234 generated by the inerting system 200. This is accomplished by using the valves 248. For example, one of the valves 248 may be a flow control valve 252 that is arranged fluidly downstream from the catalytic reactor 222. The flow control valve 252 can be used to control the flow of inert gas 234 into the fuel tank 202 such that a slightly positive pressure is always maintained in the fuel tank 202. Such positive pressure can prevent ambient air from entering the fuel tank 202 from outside during descent and therefore prevent water from entering the fuel tank 202.

As noted above, the controller 244 can be operably connected to the various components of the inerting system 200, including, but not limited to, the valves 248 and the sensors 246. The controller 244 can be configured to receive input from the sensors 246 to control the valves 248 and thus maintain appropriate levels of inert gas 234 within the ullage space 206. Further, the controller 244 can be arranged to ensure an appropriate amount of pressure within the fuel tank 202 such that, during a descent of an aircraft, ambient air does not enter the ullage space 206 of the fuel tank 202.

In some embodiments, the inerting system 200 can supply inert gas to multiple fuel tanks on an aircraft. As shown in the embodiment of FIG. 2, an inerting supply line 254 fluidly connects the fuel tank 202 to the evaporator container 210. After the inert gas 234 is generated, the inert gas 234 will flow through a fuel tank supply line 256 to supply the inert gas 234 to the fuel tank 202 and, optionally, additional fuel tanks 258, as schematically shown.

As noted above, the reaction within the catalytic reactor is an exothermic reaction that generates heat. Accordingly, even with direct cooling provided to the catalytic reactor, as described, the output mixture will still be at a raised temperature. For example, air exiting the catalytic reactor (catalyzed mixture 230) may be at or above 200° C. This temperature must be further reduced prior to supplying an inert gas into the fuel tank. For example, it may be desirable to reduce the temperature of the inert gas to about 4° C. To achieve this, the catalyzed mixture may be passed through one or more heat exchangers, condensers, and/or water separation units. As shown in FIG. 2, a heat exchanger 232 is arranged downstream from the outlet of the catalytic reactor 222. This heat exchanger may provide for thermal transfer from the catalyzed mixture to a cooler air. In accordance with embodiments of the present disclosure, the cooler air is cabin outflow or cabin discharge air.

Cabin outflow air is typically ejected overboard from an aircraft, and may be used for thrust recovery. Thrust recovery, in this case, is the use of cabin exhaust to generate additional thrust. However, the cabin outflow air is typically about 30° C. By increasing this cabin outflow air temperature, improved operations may be achieved using such increased temperature cabin outflow. In accordance with some embodiments of the present disclosure, catalytic inerting architecture designs, as shown and described above, and variations thereon, may be employed to boost cabin outflow temperatures. The exothermic reaction within the catalytic reactor may be employed to provide heat up of the cabin outflow (flowing through a heat exchanger that is part of the inerting system). Stated another way, and as described above, embodiments of the present disclosure employ cabin outflow to cool catalytic inerting reactor outlet temperatures and reduce the heat load on a downstream condenser/water extractor. Accordingly, embodiments of the present disclosure can avoid using RM circuit air or less heat may be dumped into a RAM circuit so that the system uses an existing cooling and does not require an independent RAM door for cooling of the catalytic system. In addition, embodiments of the present disclosure can enable the condenser of an inerting system to be located closer to the fuel tank and to increase energy contained in the cabin outflow air for thrust recovery and other uses such as driving an ACM turbine.

Figure 3:
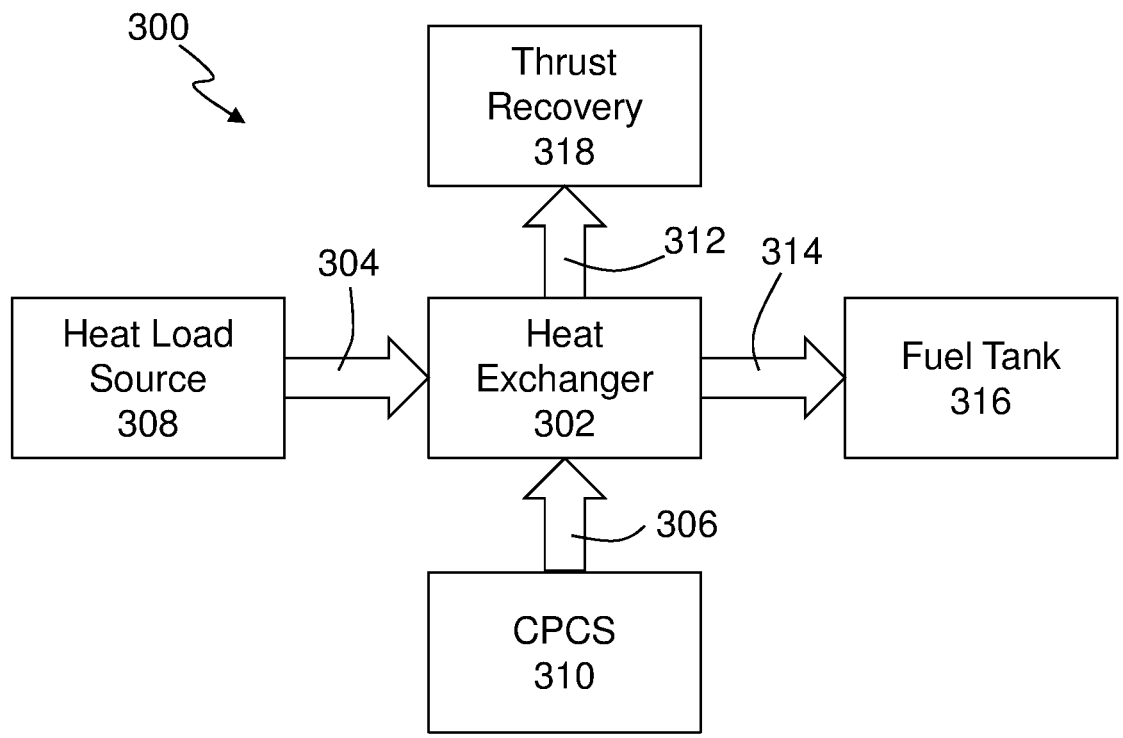
FIG. 3 is a schematic diagram of a cabin outflow temperature control system in accordance with an embodiment of the present disclosure.

Turning now to FIG. 3, an example embodiment of a cabin outflow temperature control system 300 in accordance with an embodiment of the present disclosure is shown. The cabin outflow temperature control system 300 uses a heat exchanger 302 to transfer thermal energy (heat) from heat load discharge air 304 to cabin outflow air 306. In this configuration the heat load discharge air 304 is an output from a heat load source 308 (e.g., any exothermic subsystem such as a catalytic reactor that is part of a fuel tank inerting system, as shown and described above or any other exothermic activity). The cabin outflow air 306 is pulled from a cabin pressurization control system (CPCS) 310 of the aircraft. As the cabin outflow air 306 passes through the heat exchanger 302, the cabin outflow air 306 will have heat pickup, thus generating high temperature cabin outflow air 312 that exits the heat exchanger 302. As noted above, the cabin outflow air 306 may have a temperature of about 30° C. However, after passing through the heat exchanger 302, the high temperature cabin outflow air 312 may have an increased temperature of about 90° C. (or greater). In some embodiments, the cabin outflow air 306 may have a temperature increase by two, three, or four time, due to the heat picked up from the exothermic reactions of the heat load source 308 within the heat exchanger 302. As a result, the high temperature cabin outflow air 312 will have higher thermal energy for further use in downstream operations (e.g., to perform work) as compared to the cabin outflow air 306. In addition, increasing the temperature of the cabin outflow air 306 to generate the high temperature cabin outflow air 312 will increase the molecular speed which is directly proportional to the mean kinetic energy.

The heat load discharge air 304 will be cooled because heat will be extracted therefrom by the cabin outflow air 306, and thus a low temperature discharge air 314 may exit the heat exchanger 302. The heat load discharge air 304 may have temperatures at 200° C. or greater as it enters the heat exchanger 302. However, due to the heat pickup by the cabin outflow air 306, the low temperature discharge air 314 may have a temperature of about 80° C. or less. For example, in some operational configurations, the heat exchanger 302 may cause the heat load discharge air 304 to reduce in temperature from about 350° C. at the inlet to the heat exchanger 302 to about 40° C. at the outlet of the heat exchanger 302. This cooled low temperature discharge air 314 may be used to supply an inert gas to a fuel tank 316, similar to that described above. In some embodiments, further cooling may be performed on the low temperature discharge air 314, such as with a condenser or water separator.

The high temperature cabin outflow air 312 may be directed to do work or perform other downstream functions. For example, in this illustrative embodiment, the high temperature cabin outflow air 312 may be dumped to the exterior of the aircraft through a downstream operation system, such as a thrust recovery system 318 (e.g., thrust recovery valve and associated components). The thrust recovery system 318 may be arranged or configured to discharge an exhaust of the high temperature cabin outflow air 312 to enable thrust recovery (i.e., compensate for a portion of thrust losses, such as bleed intake, or drag created, such as RAM air intake through a RAM door).

Cabin outflow air may typically be discharged through a thrust recovery operation. However, because typical cabin outflow air is relatively cold, the amount of thrust recovery may be limited. In contrast, advantageously, by increasing the temperature of the cabin outflow air (to generate the high temperature cabin outflow air) an increased thrust recovery operation may be performed due to the increased molecular kinetic energy of the available air. This operation can be achieved by sizing the heat exchanger 302 to minimize a pressure drop across the heat exchanger 302 and limit or reduce back pressure to the CPCS 310.

Figure 4:
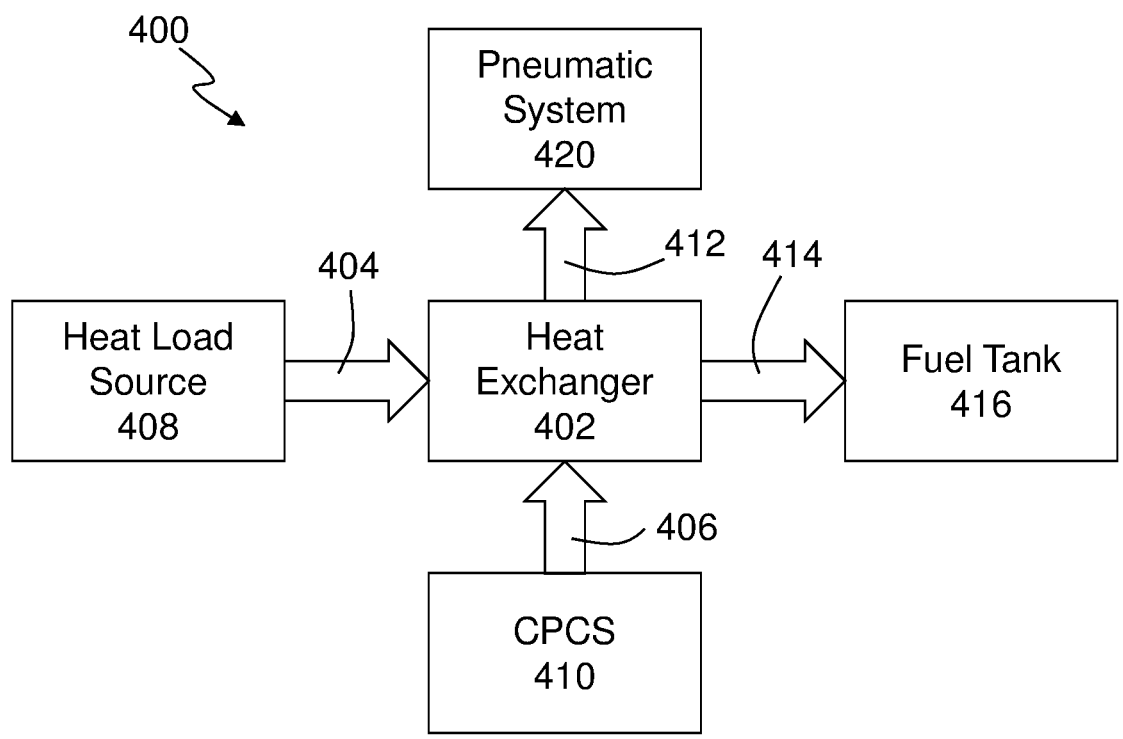
FIG. 4 is a schematic diagram of a cabin outflow temperature control system in accordance with an embodiment of the present disclosure.

Turning now to FIG. 4, an example embodiment of a cabin outflow temperature control system 400 in accordance with an embodiment of the present disclosure is shown. The cabin outflow temperature control system 400 uses a heat exchanger 402 to transfer thermal energy (heat) from heat load discharge air 404 to cabin outflow air 406. In this configuration the heat load discharge air 404 is an output from a heat load source 408 (e.g., any exothermic subsystem such as a catalytic reactor that is part of a fuel tank inerting system, as shown and described above). The cabin outflow air 406 is pulled from a cabin pressurization control system (CPCS) 410 of the aircraft. As the cabin outflow air 406 passes through the heat exchanger 402, the cabin outflow air 406 will have heat pickup, thus generating high temperature cabin outflow air 412 that exits the heat exchanger 402. The high temperature cabin outflow air 412 will have an increased temperature as compared to typical cabin outflow air (i.e., as compared to the cabin outflow air 406 prior to entering the heat exchanger 402). Similar to that described above, the heat load discharge air 404 will be cooled to generate low temperature discharge air 414 that exits the heat exchanger 402, and may be directed to a destination, such as a fuel tank 416.

In the example configuration of FIG. 4, the high temperature cabin outflow air 412 may be directed to do work onboard an aircraft. For example, the high temperature cabin outflow air 412 may be directed to a downstream operation system, such as powering a downstream pneumatic system 420. The downstream pneumatic system 420 may be, for example, a turbine to drive a compressor or a fan (e.g., an air cycle machine using a turbine to drive a compressor and/or a fan connected through a shaft). The turbine that is driven by the high temperature cabin outflow air 412 will have higher available kinetic energy due to the high temperature cabin outflow air 412 as compared to a normal (un-heated) cabin outflow air (e.g., cabin outflow air 406). Alternatively, the high temperature cabin outflow air 412 may be directed to drive a turbine or power extraction system (i.e., a downstream pneumatic system 420) used to generate other forms of energy on an aircraft (e.g., a downstream pneumatic system to drive a compressor instead of an electric driven compressor).

Figure 5:
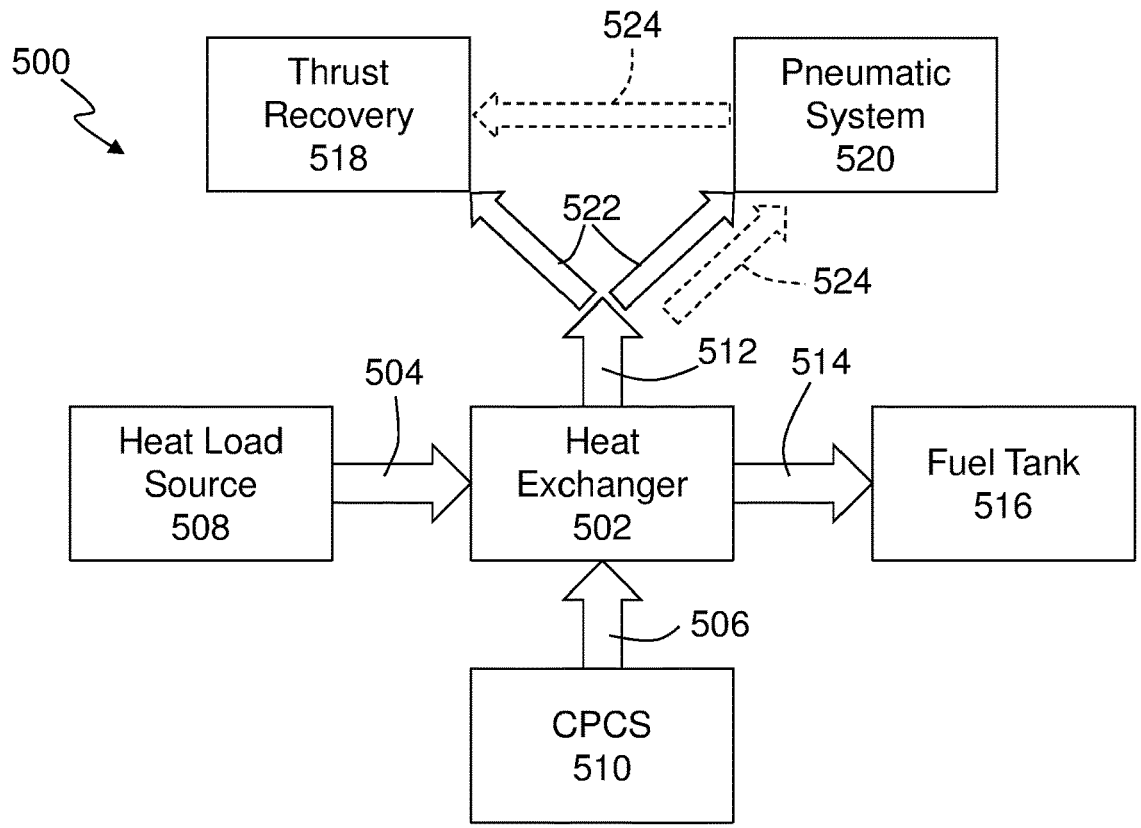
FIG. 5 is a schematic diagram of a cabin outflow temperature control system in accordance with an embodiment of the present disclosure.

Turning now to FIG. 5, an example embodiment of a cabin outflow temperature control system 500 in accordance with an embodiment of the present disclosure is shown. The cabin outflow temperature control system 500 uses a heat exchanger 502 to transfer thermal energy (heat) from heat load discharge air 504 to cabin outflow air 506. In this configuration the heat load discharge air 504 is an output from a heat load source 508 (e.g., any exothermic subsystem such as a catalytic reactor that is part of a fuel tank inerting system, as shown and described above). The cabin outflow air 506 is pulled from a cabin pressurization control system (CPCS) 510 of the aircraft. As the cabin outflow air 506 passes through the heat exchanger 502, the cabin outflow air 506 will have heat pickup, thus generating high temperature cabin outflow air 512 that exits the heat exchanger 502. The high temperature cabin outflow air 512 will have an increased temperature as compared to typical cabin outflow air (i.e., as compared to the cabin outflow air 506 prior to entering the heat exchanger 502). Similar to that described above, the heat load discharge air 504 will be cooled to generate low temperature discharge air 514 that exits the heat exchanger 502, and may be directed to a destination, such as a fuel tank 516.

In the example configuration of FIG. 5, the high temperature cabin outflow air 512 may be directed to multiple systems and/or perform multiple functions. For example, the high temperature cabin outflow air 512 may be configured to both do work onboard an aircraft and be used for thrust recovery. For example, the high temperature cabin outflow air 512 may be directed to a downstream operation system having both a thrust recovery system 518 (thrust recovery operation) and a downstream pneumatic system 520 (downstream work).

As shown in FIG. 5, one configuration of dual use may be parallel operation, as indicated by the solid-line arrows 522. In this configuration a first portion of the high temperature cabin outflow air 512 is split off and directed to the thrust recovery unit 518 and a second portion of the high temperature cabin outflow air 512 is directed to the downstream pneumatic system 520. Thus, both thrust recovery and work may be achieved with the high temperature cabin outflow air 512. In an alternative configuration, an operation in series may be employed, as indicated by the dashed-line arrows 524. In this series-operation, the high temperature cabin outflow air 512 first drives the downstream pneumatic system 520 and is then directed for a thrust recovery operation at the thrust recovery unit 518 (such as when the air exits an Air Cycle Machine Turbine in to the RAM channel and used as RAM thrust recovery). The high temperature cabin outflow air 512 will have a higher kinetic energy remaining than the normal cabin outflow air 506 after being used to generate power through a turbine or power generation system. As a result, there will be higher RAM thrust recovery using the high temperature cabin outflow air 512 as compared to unheated (i.e. typical) cabin outflow air 506.

Figure 6:
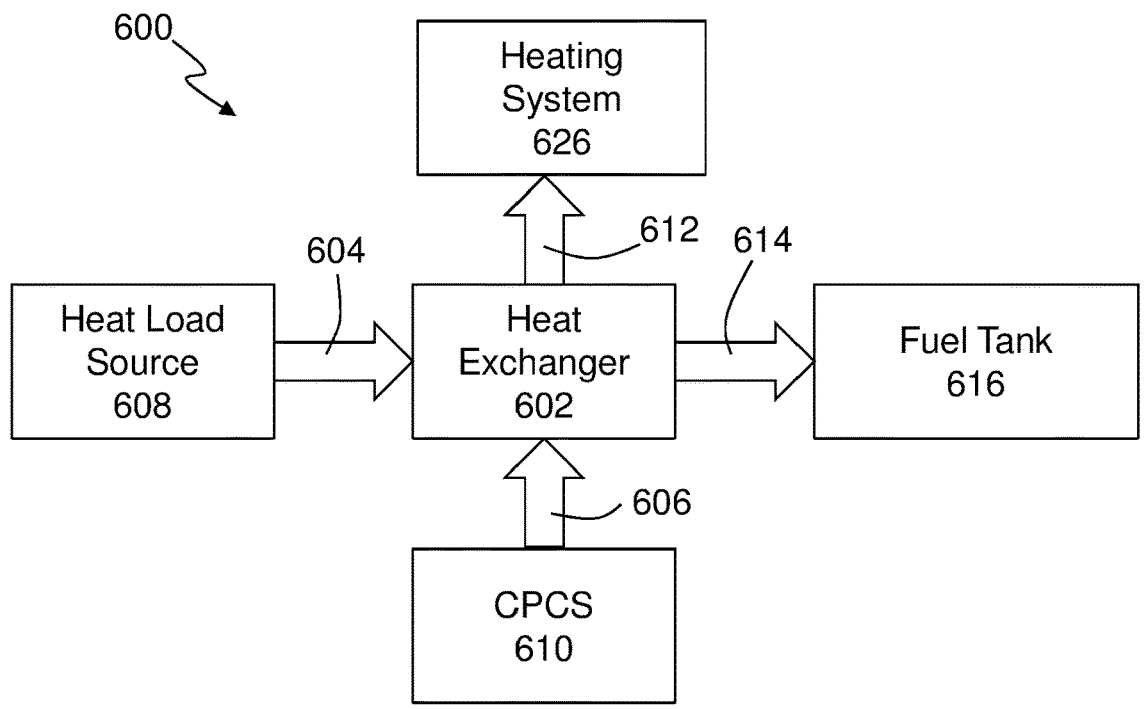
FIG. 6 is a schematic diagram of a cabin outflow temperature control system in accordance with an embodiment of the present disclosure.

Turning now to FIG. 6, an example embodiment of a cabin outflow temperature control system 600 in accordance with an embodiment of the present disclosure is shown. The cabin outflow temperature control system 600 uses a heat exchanger 602 to transfer thermal energy (heat) from heat load discharge air 604 to cabin outflow air 606. In this configuration the heat load discharge air 604 is an output from a heat load source 608 (e.g., any exothermic subsystem such as a catalytic reactor that is part of a fuel tank inerting system, as shown and described above). The cabin outflow air 606 is pulled from a cabin pressurization control system (CPCS) 610 of the aircraft. As the cabin outflow air 606 passes through the heat exchanger 602, the cabin outflow air 606 will have heat pickup, thus generating high temperature cabin outflow air 612 that exits the heat exchanger 602. The high temperature cabin outflow air 612 will have an increased temperature as compared to typical cabin outflow air (i.e., as compared to the cabin outflow air 606 prior to entering the heat exchanger 602). Similar to that described above, the heat load discharge air 604 will be cooled to generate low temperature discharge air 614 that exits the heat exchanger 602, and may be directed to a destination such as a fuel tank 616.

In the example configuration of FIG. 6, the high temperature cabin outflow air 612 may be directed to a heating system 626. That is, the high temperature cabin outflow air 612 may be used as a heat source for anti-ice or heating use on an aircraft. As such, the high temperature cabin outflow air 612 can reduce or avoid the use of an onboard heater or eliminate the need to tap bleed air as a heat source to perform anti-ice or heating operations onboard an aircraft.

Figure 7:
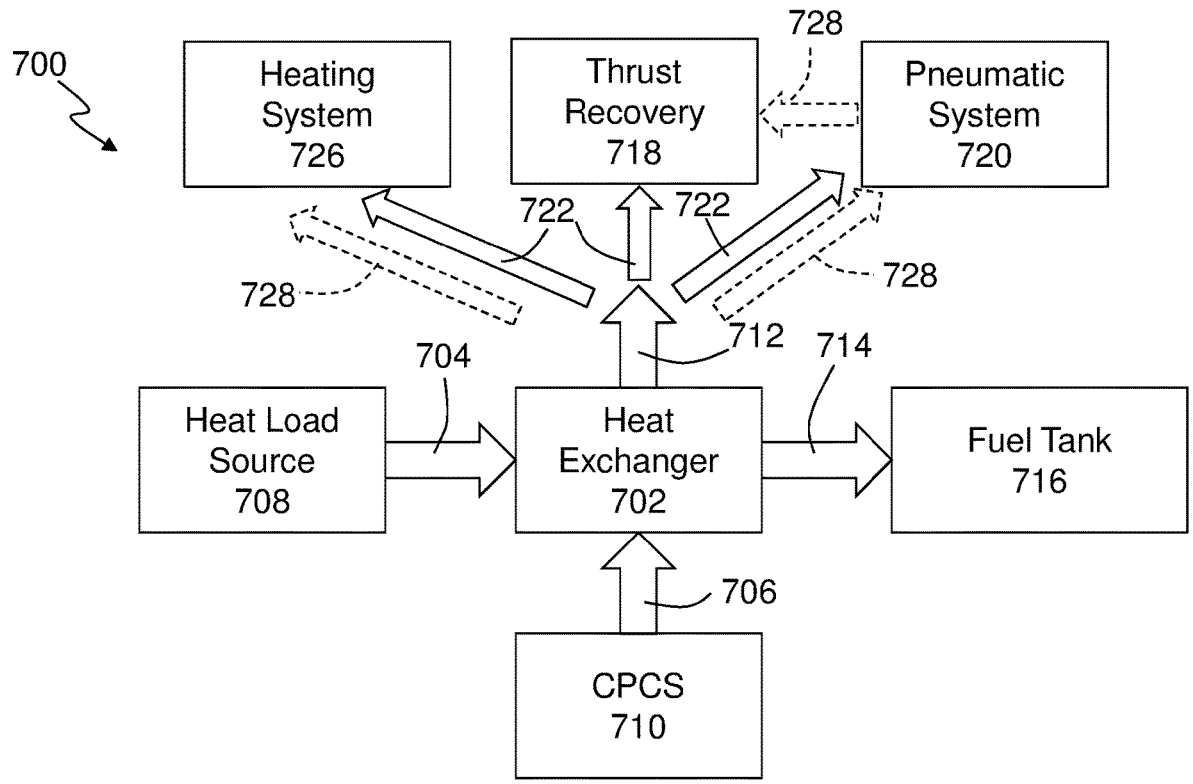
FIG. 7 is a schematic diagram of a cabin outflow temperature control system in accordance with an embodiment of the present disclosure.

Turning now to FIG. 7, an example embodiment of a cabin outflow temperature control system 700 in accordance with an embodiment of the present disclosure is shown. The cabin outflow temperature control system 700 uses a heat exchanger 702 to transfer thermal energy (heat) from heat load discharge air 704 to cabin outflow air 706. In this configuration the heat load discharge air 704 is an output from a heat load source 708 (e.g., any exothermic subsystem such as a catalytic reactor that is part of a fuel tank inerting system, as shown and described above). The cabin outflow air 706 is pulled from a cabin pressurization control system (CPCS) 710 of the aircraft. As the cabin outflow air 706 passes through the heat exchanger 702, the cabin outflow air 706 will have heat pickup, thus generating high temperature cabin outflow air 712 that exits the heat exchanger 702. The high temperature cabin outflow air 712 will have an increased temperature as compared to typical cabin outflow air (i.e., as compared to the cabin outflow air 506 prior to entering the heat exchanger 702). Similar to that described above, the heat load discharge air 704 will be cooled to generate low temperature discharge air 714 that exits the heat exchanger 702, and may be directed to a destination such as a fuel tank 716.

In the example configuration of FIG. 7, the high temperature cabin outflow air 712 may be directed to multiple systems and/or perform multiple functions. For example, the high temperature cabin outflow air 712 directed to a thrust recovery system 718, a downstream pneumatic system 720, and/or a heating system 726. As such, the high temperature cabin outflow air 712 may be configured to do work onboard the aircraft within the downstream pneumatic system 720, operate as a heat source for anti-ice systems or other heating systems 726, and be used for thrust recover within the thrust recovery system 718.

As shown in FIG. 7, one configuration of multi-use of the high temperature cabin outflow air 712 may be through a parallel-operation, as indicated by the solid-line arrows 722. In this parallel-operation configuration, a first portion of the high temperature cabin outflow air 712 is split off and directed to the thrust recovery system 718, a second portion of the high temperature cabin air 712 is directed to a heating system 726, and a third portion of the high temperature cabin outflow air 712 is directed to the downstream pneumatic system 720. In an alternative configuration, a combination of both series- and parallel-operation may be employed, as indicated by the dashed-line arrows 728. In this combination-operation, a first portion of the high temperature cabin outflow air 712 can be directed to first drive the downstream pneumatic system 720 and then directed to a thrust recovery system 718 (i.e., series-operation) and a second portion may be directed, in parallel, to a heating system 726 of the aircraft.

Although various different configurations and downstream operations and systems are shown and described with respect to FIGS. 3-7, such configurations are merely for example purposes and are not to be limiting. That is, it will be appreciated that other types of downstream operations may be configured to receive and employ the increased temperature air provided by the high temperature cabin outflow air that is output from the heat exchangers arranged as shown and described above. That is, typically, an output from a CPCS (i.e., cabin exhaust air) will have a relatively low temperature and thus low kinetic energy. However, by directing the output from the CPCS through a heat exchanger such that the cabin exhaust air will have heat pick up (and thus increased kinetic energy), the heated air may be used to perform various different operations, actions, and/or functions that are downstream from the heat exchanger.

Figure 8:
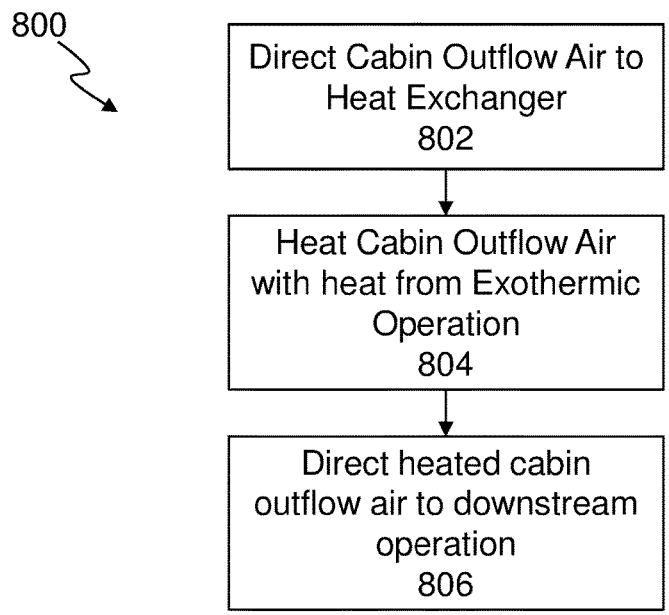
FIG. 8 is a flow process for using cabin outflow air in accordance with an embodiment of the present disclosure.

Turning now to FIG. 8, a flow process 800 for using cabin outflow air in accordance with an embodiment of the present disclosure is shown. The flow process 800 may be employed on an aircraft having a cabin and an exothermic system or source (e.g., catalytic reactor).

At block 802, cabin outflow air is directed from an aircraft cabin to a heat exchanger. The cabin outflow air may be sourced from a cabin pressurization control system (CPCS) of the aircraft. The heat exchanger is arranged downstream of the exothermic source and downstream of the CPCS, and thus configured to receive output from the CPCS and the exothermic source.

At block 804, the cabin outflow air is heated within the heat exchanger. The heated cabin outflow air may be substantially heated by a heat pick-up operation, extracting heat from air that is output from the exothermic source. For example, the cabin outflow air may be heated from about 30° C. to about 200° C. to generate high temperature cabin outflow air.

At block 806, the high temperature cabin outflow air is directed to a downstream operation. For example, the downstream operation can include thrust recovery operations, heating operations, anti-ice operations, power generation operations, etc., and/or combinations thereof (in series, parallel, or combinations of series and parallel).

Advantageously, embodiments of the present disclosure provide for improved and efficient operations using cabin outflow air on aircraft. By heating cabin outflow air, the high temperature cabin outflow air can be used for one or more operations downstream of a heating process. The heating may be achieved using heat from an exothermic operation on the aircraft (e.g., catalytic inerting system). Additionally, by heating the cabin outflow air, inert gas generated within an associated catalytic inerting system may be cooled, thus eliminating the amount of cooling provided by other sources (e.g., RAM air). Moreover, improved or additional thrust recovery may be achieved by using the high temperature cabin outflow air, as compared to typical cabin outflow air temperatures. Further, such high temperature cabin outflow air may be used to perform work on the aircraft, such as to drive a turbine for power generation, air cycle machines, or other operations.

The use of the terms "a," "an," "the," and similar references in the context of description (especially in the context of the following claims) are to be construed to cover both the singular and the plural, unless otherwise indicated herein or specifically contradicted by context. The modifier "about" and/or "approximately" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the invention has been described in detail in connection with only a limited number of embodiments, it should be readily understood that the invention is not limited to such disclosed embodiments. Rather, the invention can be modified to incorporate any number of variations, alterations, substitutions, combinations, sub-combinations, or equivalent arrangements not heretofore described, but which are commensurate with the spirit and scope of the invention. Additionally, while various embodiments of the invention have been described, it is to be understood that aspects of the invention may include only some of the described embodiments.

Accordingly, the present disclosure is not to be seen as limited by the foregoing description, but is only limited by the scope of the appended claims.

What is claimed is:

1. A cabin outflow temperature control system for an aircraft comprising:
   an aircraft cabin;
   a heat load source;
   a heat exchanger configured to receive cabin outflow air from the aircraft cabin and heat load discharge air from the heat lead source, the heat exchanger configured to enable thermal transfer from the heat load discharge air to the cabin outflow air to generate high temperature cabin outflow air and low temperature discharge air as outputs from the heat exchanger; and
   one or more downstream operation systems configured to receive the high temperature cabin outflow air and perform a downstream operation using said high temperature cabin outflow air, wherein the one or more downstream operation systems comprises a thrust recovery system and a downstream pneumatic system of the aircraft, arranged in series, such that the high temperature cabin outflow air is directed to the downstream pneumatic system first and then to the thrust recovery system.

2. The system of claim 1, wherein the heat load source is a catalytic reactor of an aircraft fuel tank inerting system.

3. The system of claim 2, further comprising a condenser configured to receive the low temperature discharge air prior to directing an inert gas to a fuel tank ullage.

4. The system of claim 1, wherein the one or more downstream operation systems comprises at least one of thrust recovery system, a downstream pneumatic system, or a heating system.

5. The system of claim 1, wherein the one or more downstream operation systems comprises power generation system.

6. The system of claim 1, wherein the one or more downstream operation systems comprises a thrust recovery system and a downstream pneumatic system of the aircraft, arranged in parallel, such that a first portion of the high temperature cabin outflow air is directed to the thrust recovery system and a second portion of the high temperature cabin outflow air is directed to the downstream pneumatic system.

7. The system of claim 1, wherein the one or more downstream operation systems comprises a thrust recovery system, a heating system, and a downstream pneumatic system of the aircraft, arranged in parallel, such that a first portion of the high temperature cabin outflow air is directed to the thrust recovery system, a second portion of the high temperature cabin outflow air is directed to the heating system, and a third portion of the high temperature cabin outflow air is directed to the downstream pneumatic system.

8. The system of claim 1, wherein the cabin outflow air has a temperature of 30° C. and the high temperature cabin outflow air has a temperature of 200° C.

9. The system of claim 1, wherein the heat load discharge air has a temperature of 200° C. or greater and the low temperature discharge air has a temperature of 80° C. or less.

10. A method of using cabin outflow on an aircraft, the method comprising:
    directing aircraft cabin outflow air to a heat exchanger;
    directing a heat load discharge air to the heat exchanger from a heat load source;
    causing a thermal transfer from the heat load discharge air to the cabin outflow air to generate high temperature cabin outflow air and low temperature discharge air as outputs from the heat exchanger; and
    performing one or more downstream operations using said high temperature cabin outflow air,
    wherein the one or more downstream operations comprise a thrust recovery operation and a power generation operation, wherein the thrust recovery operation and the power generation are performed in series such that the high temperature cabin outflow air is directed to the power generation operation first and subsequently to the thrust recovery operation.

11. The method of claim 10, wherein the heat load source is a catalytic reactor of an aircraft fuel tank inerting system.

12. The method of claim 11, further comprising condensing the low temperature discharge air to extract water from the low temperature discharge air prior to directing an inert gas to a fuel tank ullage.

13. The method of claim 10, wherein the one or more downstream operations comprise at least one of a thrust recovery operation, a heating operation, and a downstream pneumatic operation.

14. The method of claim 10, wherein the one or more downstream operations is a power generation operation.

15. The method of claim 10, wherein the one or more downstream operations comprise a thrust recovery operation and a power generation operation, wherein the thrust recovery operation and the power generation are performed in parallel such that a first portion of the high temperature cabin outflow air is directed to the thrust recovery operation and a second portion of the high temperature cabin outflow air is directed to the power generation operation.

16. The method of claim 10, wherein the one or more downstream operations comprise a thrust recovery operation, a heating operation, and a power generation operation, wherein the power generation operation and the thrust recovery operation are performed in series using a first portion of the high temperature cabin outflow air and a second portion of the high temperature cabin outflow air is directed to the heating operation in parallel.

17. The method of claim 10, wherein the cabin outflow air has a temperature of about 30° C. and the high temperature cabin outflow air has a temperature of 200° C.

18. The method of claim 10, wherein the heat load discharge air has a temperature of 200° C. or greater and the low temperature discharge air has a temperature of 80° C. or less.

19. A cabin outflow temperature control system for an aircraft comprising:
    an aircraft cabin;
    a heat load source;
    a heat exchanger configured to receive cabin outflow air from the aircraft cabin and heat load discharge air from the heat lead source, the heat exchanger configured to enable thermal transfer from the heat load discharge air to the cabin outflow air to generate high temperature cabin outflow air and low temperature discharge air as outputs from the heat exchanger; and
    one or more downstream operation systems configured to receive the high temperature cabin outflow air and perform a downstream operation using said high temperature cabin outflow air,
    wherein at least one of (i) the cabin outflow air has a temperature of 30° C. and the high temperature cabin outflow air has a temperature of 200° C., or (ii) the heat load discharge air has a temperature of 200° C. or greater and the low temperature discharge air has a temperature of 80° C. or less.

* * * * *